Feb. 19, 1924.

J. B. MATTESON

WHEEL

Filed June 2, 1922

J. B. Matteson, INVENTOR

BY Victor J. Evans ATTORNEY

WITNESS:

Feb. 19, 1924.
J. B. MATTESON
WHEEL
Filed June 2, 1922

J. B. Matteson, INVENTOR

BY Victor J. Evans
ATTORNEY

WITNESS:

Patented Feb. 19, 1924.

1,484,228

UNITED STATES PATENT OFFICE.

JUAN B. MATTESON, OF JEFFERSON, IOWA.

WHEEL.

Application filed June 2, 1922. Serial No. 565,284.

*To all whom it may concern:*

Be it known that I, JUAN B. MATTESON, a citizen of the United States, residing at Jefferson, in the county of Greene and State of Iowa, have invented new and useful Improvements in Wheels, of which the following is a specification.

My present invention has reference to traction wheels.

My primary object is to simplify and improve the existing art by producing a traction wheel that shall be of a simple but sturdy construction, wherein the spokes are integrally formed but extend at opposite angles from the hub and are secured to flanged rims, the latter being connected by angularly arranged body portions of calks, the construction being such as to insure a firm traction engagement of the wheel with the ground surface and the sifting of dirt between the calks, spokes and hub so that none of the parts constituting the wheel will be clogged by dirt.

The foregoing, and many other objects which will present themselves as the nature of the invention is better understood, may be accomplished by a construction, combination and operative association of parts, such as is disclosed by the drawings which accompany and which form part of this application.

In the drawings:—

Figure 1 is a side elevation of a wheel in accordance with this invention.

Figure 2 is an edge view thereof.

Figure 1:
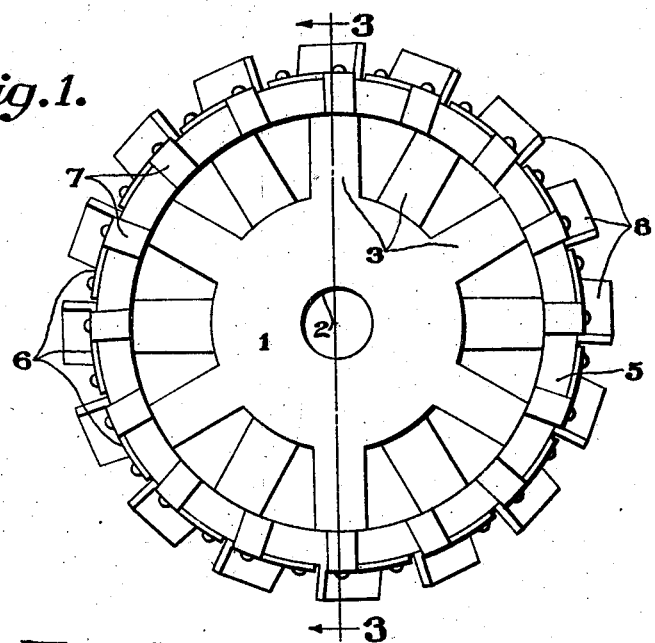
Figure 2:
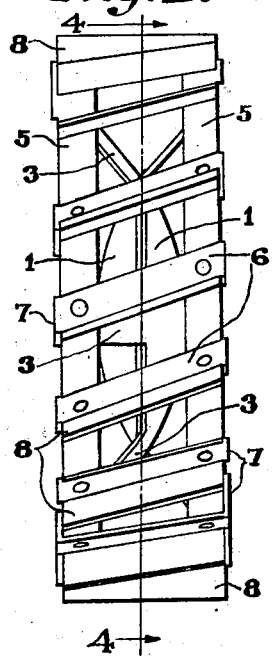
Figure 3:
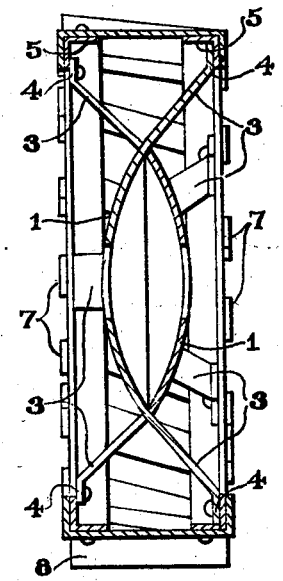
Figure 3 is a sectional view on the line 3—3 of Figure 1.
Figure 4:
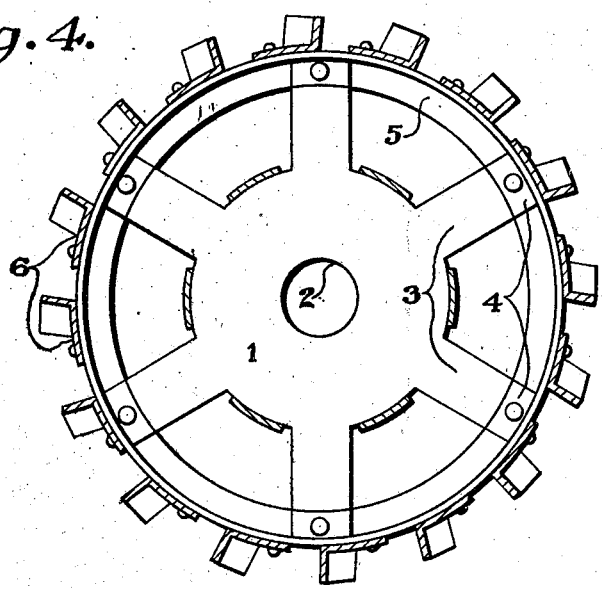
Figure 4 is a sectional view on the line 4—4 of Figure 2.
Figure 5:
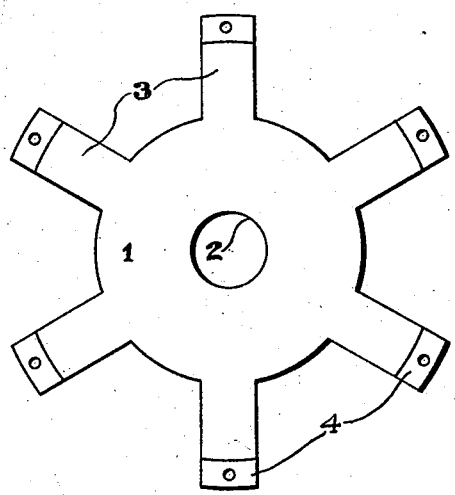

Figure 5 is a view of one of the side or hub members and the spokes which are integrally formed therewith.

Figure 6:
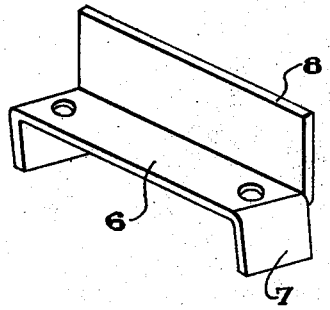

Figure 6 is a perspective view of one of the calks.

My improved traction wheel is preferably wholly constructed of metal, and comprises a pair of disk members 1 respectively which are bulged outwardly from their edges, their said edges being in contacting engagement and secured together in any desired or preferred manner. The disks provide the sides and the hub portion of the wheel. The disks are centrally provided with a round opening 2 for the axle skein.

Each disk 1 has its periphery provided with oppositely disposed angularly arranged spokes 3. The spokes are in the nature of flat members, and are extended from the disks approximately at the same curvature as that of the disks. The spokes on one of the sides or disks extend through the space between the adjacent pairs of spokes on the second side or disk, and said spokes are in contacting engagement with the periphery of the said disks. The edges of the sides or disks between the spokes are likewise in contacting engagement. All of the spokes have their ends straight, as at 4, and the said straight ends are secured in any desired or preferred manner to the inner flanges of angle ring members 5 that provide the rim of the wheel. On the outer flanges of the rim rings 5 there rest and may be secured the angularly disposed body portions 6 of calks. The body portions 6 have their ends extended in the same angular direction, as indicated by the numeral 7, the said angle portions being in contact with the outer faces of the rim members 5 and being also secured thereto. Each body 6 has one of its edges formed with an outwardly extending flanged portion 8 that provides the calk proper.

A wheel constructed as above described may be cheaply manufactured, will be strong and effective, while the ground plowed up by the calks will freely flow between the bodies thereof and the spokes and will be directed away from the wheel by contact with the angle portions of the spokes or with the outwardly bellied portions of the sides or hub portions 1 of the wheel.

Having described the invention, I claim:—

A metal traction wheel including sides comprising outwardly bulged disks having their peripheries formed with spaced flat spokes disposed at approximately the same curvature as that of the disks but having their ends straight, the spokes on one of the disks passing between two of the spokes on the adjacent disk, said disks having their peripheral portions between the spokes in contacting engagement, angle rings to which the straight ends of the respective series of spokes are connected, and transversely arranged calk carrying plates disposed angularly over and secured to the rings.

In testimony whereof I affix my signature.

JUAN B. MATTESON.